Nov. 28, 1933.  A. E. JOHNSON  1,937,227
DISPENSING BARREL ELEVATOR AND SUPPORT
Filed Nov. 25, 1932
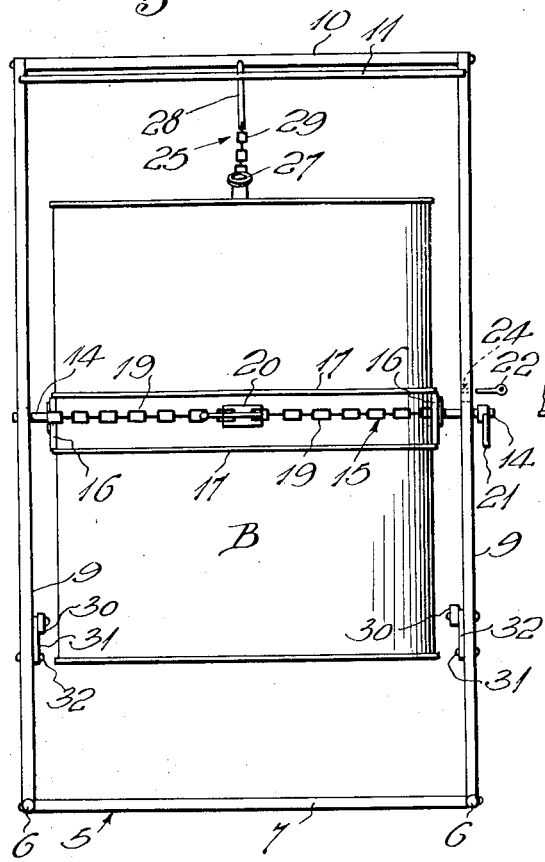
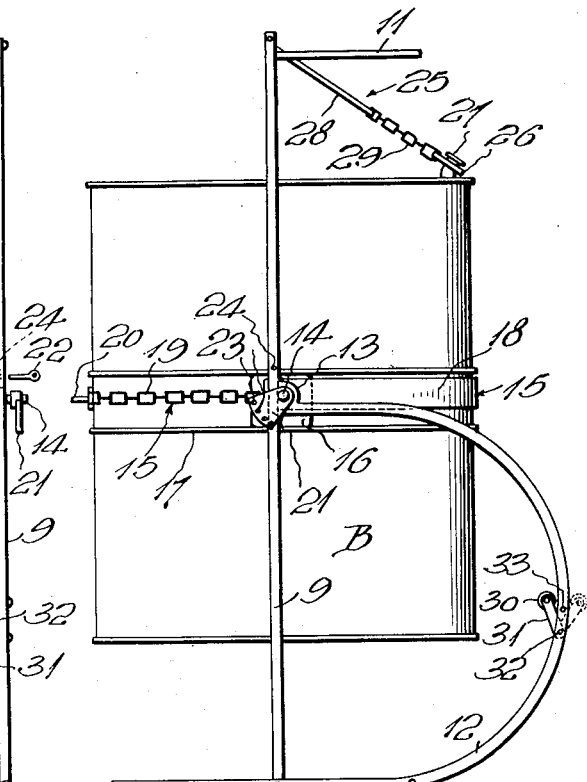
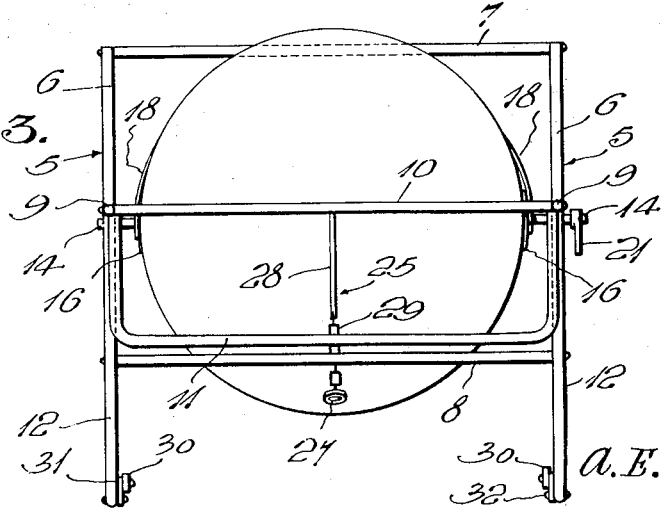
Inventor
A. E. Johnson Patented Nov. 28, 1933

1,937,227

UNITED STATES PATENT OFFICE 1,937,227

DISPENSING BARREL ELEVATOR AND SUPPORT

Arthur E. Johnson, El Paso, Tex., assignor of one-half to Francis Vesely, Silver City, N. Mex.

Application November 25, 1932
Serial No. 644,338

1 Claim. (Cl. 248—55)

The invention aims to provide a rather simple and inexpensive, yet an efficient, convenient and easily operated support for elevating a barrel or the like and pivotally supporting it so that its contents may be readily discharged simply by tilting.

A further aim is to provide novel and advantageous means for engaging the barrel and pivotally supporting it upon the frame of the support.

Yet another aim is to provide unique means for holding the barrel against tilting to dispensing position except when desired, said means embodying a lock to prevent release thereof by unauthorized persons, so that barrel contents cannot be wasted or stolen.

With the foregoing in view, the invention resides in the novel subject matter hereinafter described and claimed, description being accomplished by reference to the accompanying drawing.

Fig. 1 is a front elevation.
Fig. 2 is a side elevation.
Fig. 3 is a top plan view.

A preferred construction has been shown and will be specifically described, with the understanding however, that within the scope of the invention as claimed, variations may be made.

Briefly, the invention comprises a supporting frame having rockers upon which it may be rocked from a horizontal barrel-receiving position to a vertical barrel-supporting position in which it pivotally supports the barrel so that it may be tilted to dispensing position, said frame having a base upon which it solidly rests when in barrel-supporting position. By swinging the frame downwardly and connecting it with the barrel, and then swinging said frame to a vertical position, it elevates and pivotally mounts the barrel in convenient position for dispensing.

The base of the frame is denoted at 5, said base comprising parallel side bars 6 connected at their rear ends by a transverse bar 7 and connected at their front ends by a transverse bar 8. Two parallel standards 9 are secured to the bars 6 and are of a height to project above the barrel B when the latter is supported by the frame, the upper ends of these standards being connected by a horizontal bar 10 and by a U-shaped handle bar 11. Two substantially C-shaped rockers 12 are joined to the front ends of the side bars 6, the upper ends of these rockers being connected with the standards 9, so that each standard and its respective rockers 12 forms a side frame supported by the base 5, the two side frames being laterally spaced to receive the barrel B between them.

In order to facilitate shipment in compact space, the transverse bars 7 and 8 are preferably connected detachably with the side bars 6, the standards 9 are detachably connected with said side bars 6, the rockers 12 are detachable from the standards 9, and the parts 10 and 11 are also detachable.

Carried by the side frames above mentioned, preferably by the upper ends of the rockers 12, are two horizontal-axis bearings 13. These bearings rockably receive trunnions 14 projecting from a contractible collar 15 which encircles the barrel B. In the preferred construction, the trunnions 14 are rigidly secured to a pair of plates 16 adapted to lie against opposite sides of the barrel and to abut the conventional circumferential ribs 17 common to barrels of metal construction. The plates 16 are secured to opposite ends of a flexible metal strap 18 which extends substantially half way around the circumference of the barrel B. Two chains 19 and an adjustable connector 20 are provided to jointly extend around the other half of the barrel circumference, said chains being secured to the plates 16 and being connected with each other by the connector 20. This connector is of such nature that when it is sufficiently loosened, it permits disconnection of the chains 19 from each other to allow easy removal of one barrel and substitution of another.

For holding the barrel B in any desired dispensing position, I provide a plate 21 secured to one of the trunnions 14, and a locking pin 22 which may be passed through any of the openings 23 in said plate, into an opening 24 in the adjacent standard 9. If desired, this same locking means could be duplicated in connection with the other of the trunnions 14.

To hold the barrel B against being tilted to dispensing position by unauthorized persons, I provide an inelastic connector 25 which depends from the crown bar 10 of the frame and may be locked at 26 to the conventional discharge spout or faucet 27 of the barrel. The connector 25 is preferably formed from a rod 28 secured to the bar 10 and a chain 29 secured to said rod.

To facilitate moving of the frame from one place to another whether free of the barrel or connected with the latter, I provide projectible and retractible rollers 30 which may be moved into engagement with the floor upon which the base 5 normally rests. These rollers are carried by links 31 which are pivoted at 32 to the rockers 12, locking pins 33 being provided to hold said links when the rollers are positioned for operation. These same pins may be positioned to prevent engagement of the rollers with the floor when not desired.

To connect a barrel with the support, said barrel is set on end and the frame is swung downwardly upon the rockers 12 so that these rockers and the standards 9 are disposed at opposite sides of the barrel, the handle bar 11 then resting upon the floor. The contractible collar 15 is now engaged with and tightened upon the barrel B, whereupon the entire frame may be rocked to its vertical position by grasping one or both of the bars 10 and 11, and when the frame reaches said vertical position, it rests solidly upon the base 5 so that it tiltably supports the barrel without danger of itself tilting. The barrel may be readily turned about the trunnions 14 to any desired dispensing position, and if advisable to do so, may be locked in said dispensing position by inserting the pin or pins 22, as above explained. When it is desired to lock the barrel against unauthorized movement to dispensing position, so that its contents cannot be wasted or stolen, the connector 25 is locked to the faucet or spout 27. Whenever the frame and the barrel supported thereby, or the frame without the barrel, is to be moved, the rollers 30 may be swung to floor-engaging position to facilitate such movement.

It will be seen from the foregoing that novel and advantageous provision has been made for carrying out the objects of the invention, and although the preferred details have been shown, attention is again invited to the fact that variations may be made within the scope of the invention as claimed.

I claim:—

In a dispensing barrel elevator and support, a frame having a horizontal base to normally rest on a floor, and curved rockers to rock on said floor, permitting rocking of said frame on said floor to a lowered barrel-receiving position from a raised barrel-supporting position and vice versa, and a collar permanently carried by said frame, said collar comprising a form-sustaining semi-circular half permanently pivoted at its ends to said frame on alined horizontal axes, and a disconnectable half provided with tightening means; said collar structure, its pivots, and said rockers allowing all necessary movements of parts to permit securing of the collar around the center of the barrel while said barrel stands vertically on the floor upon which the frame is rocked to its barrel-receiving position, said pivots also allowing tilting of the barrel to dispense its contents when said barrel is supported by said frame.

ARTHUR E. JOHNSON.